J. T. CLARK.
APPARATUS FOR LOADING VESSELS.
APPLICATION FILED AUG. 9, 1910.
1,003,706.
Patented Sept. 19, 1911.
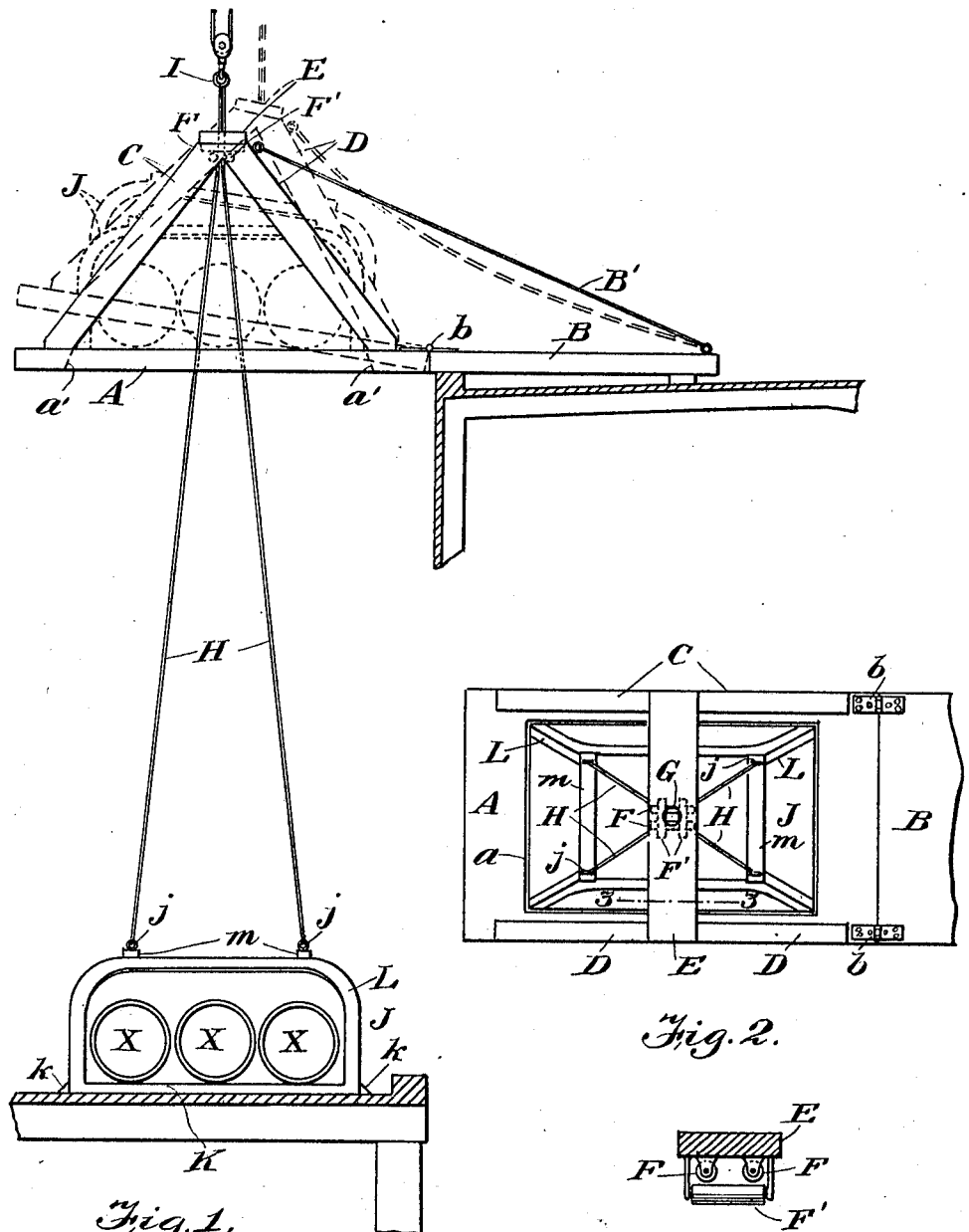
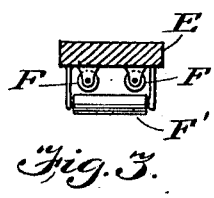
WITNESSES
INVENTOR
John T. Clark
BY
ATTORNEYS
COLUMBIA PLANOGRAPH CO., WASHINGTON, D. C.

UNITED STATES PATENT OFFICE.

JOHN T. CLARK, OF NEW YORK, N. Y.

APPARATUS FOR LOADING VESSELS.

1,003,706. Specification of Letters Patent. Patented Sept. 19, 1911.

Application filed August 9, 1910. Serial No. 576,351.

*To all whom it may concern:*

Be it known that I, JOHN T. CLARK, a citizen of the United States, residing at the city of New York, borough of Manhattan, county and State of New York, have invented a certain new and useful Apparatus for Loading Vessels, of which the following is a specification.

The invention is an apparatus for loading purposes, the same being intended for use, mainly, in loading freight into vessels, although the invention may be used in various arts for loading and unloading purposes.

The object of the invention is to rapidly discharge a load from a load carrier without the intervention of human labor, whereby freight may be handled economically.

In a broad aspect the invention embodies a vertically movable load carrier, preferably in the form of a cage, and a tiltable platform positioned in the path of the load carrier and adapted to be moved upwardly by said load carrier when the latter approaches the limit of its upward movement, whereby the platform and the load carrier are adapted for conjoint tilting movement for the purpose of discharging a load automatically from said load carrier.

In a preferred embodiment of the invention, the tiltable platform is hinged or pivoted at one end, whereby said platform is adapted to be lifted into an inclined position as the load carrier is elevated by a suitable hoisting mechanism. Coöperating with the tiltable platform is a runway or skid, and when a load is discharged from the load carrier it is delivered automatically to said runway or skid whereby the load may be delivered at any desired point such as upon a pier or landing, stage, or barge or any other point of discharge.

Other features of the invention, and the advantages thereof will appear in the course of the description hereinafter given.

In the accompanying drawings I have illustrated one practical embodiment of the invention, but the construction shown therein is to be understood as illustrative only, and not as defining the limits of the invention.

Figure 1 is a side elevation of the apparatus showing the tiltable platform supported upon the deck of a vessel and the load carrier or cage resting upon a dock, the vessel and dock being shown in section; the dotted lines showing the positions of the load carrier and the platform when discharging freight upon the deck of a vessel. Fig. 2 is a plan view of the tiltable platform and of the cage within the platform. Fig. 3 is an enlarged cross-sectional view on line 3—3 of Fig. 2, showing guide rollers.

In the drawings I have shown a platform consisting, preferably, of two sections, A, B, hinged together, as at $b$. Section, B, is fastened in any suitable manner, as by bolts to the deck of a vessel whereby the entire platform is held temporarily in a predetermined position relative to the vessel. Section, A, is supported on section, B, by the hinge $b$, and by guy ropes, B′. Section, A, of the platform is provided with a central opening, $a$, the edges of which are inclined or beveled, as at $a'$, for the reception of a load carrier, hereinafter described, and said section is provided, also, with vertically inclined side members, C, D, said members being united by a cross bar, E, the whole forming a frame extending upwardly from section, A. Carried by the cross bar, E, is a series of guide rollers, F, F′, arranged in coöperative relation to a rope receiving aperture or hole, G, which is provided centrally in said cross bar.

The rollers, F, are parallel to each other and they are supported by suitable brackets, while the rollers, F′, are parallel to each other and are positioned at right angles to the rollers, F. In the drawings I have illustrated the rollers as arranged in pairs, rollers, F, being on a plane above rollers, F′.

Through the aperture or hole, G, and in engagement with rollers, F, F′, is arranged a flexible cage suspending member, preferably a series of four cables, H, (see Fig. 2). Said cables are united at one end to a suspending ring, I, which may be fastened to any suitable hoisting means, as, for instance, a block and fall. The lower ends of the suspending cables are fastened to a load carrier or cage, J, one cable at each corner, as at $j$, to insure steadiness during the vertical movement of the load carrier.

The load carrier, J, may be of any suitable construction, but I have illustrated it as consisting of a base, K, provided with flanges, $k$, uprights, L, and cross bars, $m$. The cross bars brace the uprights, L, and, also, serve as the means to which the suspending cables are fastened for the purpose of suspending, raising and lowering the load carrier. It will be observed that the load carrier or cage, J, is open at its sides and ends, but it is obvious that the carrier may be provided with stop bars or closed sides for retaining movable freight, such as barrels or casks, from rolling off the load carrier. The load carrier, J, is represented in full lines in Fig. 1 as resting upon a dock, and casks or barrels, X, are positioned therein ready to be hoisted into a vessel. Cables, H, are fastened to the cross bars, m, of the load carrier, and they extend upwardly through the opening, a, of the platform, and, also, through the space bounded by the series of guide rollers, F, F', and, also, through the aperture or hole, G, in cross bar, E, and are attached to ring, I.

It will be understood that the rollers, F, F', serve as guides for the cables during the raising and lowering of the load carrier and prevent the cables from becoming chafed and worn as they pass through the aperture, G. The rollers are positioned for their inner edges to extend within the edges of the guide opening, G, and said rollers are thus positioned for operation in a manner to preclude the cables from coming into frictional contact with the edges of said guide opening.

The operation of the apparatus may be described as follows: The load carrier, J, being lowered into the position shown in Fig. 1, to rest upon a dock, the freight is loaded by an attendant upon the carrier, after which said carrier is lifted, by any suitable hoisting mechanism, such for instance as a block and fall, or a hoisting engine. The carrier is hoisted until it passes through the opening in the platform, A, and the flange, k, of said carrier abuts against the beveled edges, a', of opening, a, in said platform. The hoisting mechanism continues to lift the load carrier so that the hinged section, A, of the platform will also be lifted, causing it to assume the inclined position shown in dotted lines in Fig. 1. Should the freight on the load carrier consist of casks or barrels, the tilting of section, A, causes the barrels or casks to roll from the carrier and section, A, on to section, B, of the platform, from whence the load can be readily rolled to the hatchway of the vessel. It is obvious that while the platform is in a tilted position, such kinds of freight as will not automatically roll off the carrier or tilted platform may be more easily removed therefrom by an attendant than would be the case were the carrier and platform permitted to remain in horizontal positions.

The apparatus is useful, mainly, for automatically discharging barrels, casks, and other substantially cylindrical objects from a load carrier in the operation of transferring the load from a pier to a vessel, but it will be apparent that the apparatus may be employed for other purposes.

Having thus fully described the invention, what I claim as new, and desire to secure by Letters Patent, is:

1. In an apparatus of the class described, a load carrier, means for hoisting said load carrier, and a skeleton platform within which the load carrier is positioned when said load carrier is elevated, said load carrier being adapted to assume a position substantially flush with the platform and the elevation of the load carrier operating to tilt the platform to an inclined position, whereby the platform and the load carrier act conjointly in discharging the load from said carrier.

2. In an apparatus of the class described, a load carrier, means for hoisting the same, and a hinged skeleton platform within which the load carrier is positioned when said load carrier reaches the limit of its upward movement, said load carrier being adapted to assume a position substantially flush with the platform and the elevation of the load operating to tilt the load carrier to an inclined position whereby the platform and the load carrier act conjointly in discharging a load from said carrier.

3. In an apparatus of the class described, a load carrier, means for hoisting the same, and a platform positioned for coöperation with said load carrier as the latter approaches the limit of its upward movement, said platform and load carrier being substantially flush with each other when in coöperative relation, and operating conjointly to automatically discharge a load from said load carrier.

4. In an apparatus of the class described, a load carrier, a platform provided with an opening adapted to receive said load carrier, and hoisting mechanism operative to elevate the load carrier and to position it within said opening of the platform and in substantially flush relation to said platform whereby the elevation of the load carrier will tilt the platform and automatically discharge the load.

5. In an apparatus of the class described, a load carrier, a platform provided with an opening adapted to receive said load carrier, said platform being hinged at one edge, and hoisting mechanism adapted to elevate the load carrier and to position it within said opening of the platform, whereby the elevation of the load carrier will tilt the hinged platform.

6. In an apparatus of the class described, a load carrier, hoisting cables therefor, a platform positioned for coöperation with the load carrier and movable thereby into an inclined position as said load carrier reaches the limit of its upward movement, and a plurality of guides coöperating with said hoisting cables.

7. In an apparatus of the class described, a hinged platform, a frame carried by said platform and provided with a cable receiving opening, friction rollers supported on said frame and positioned adjacent to said opening, a load carrier, and hoisting ropes attached to said load carrier and extending through said openings, said cable coöperating with the rollers.

In testimony whereof, I have signed my name to this specification in the presence of two subscribing witnesses.

JOHN T. CLARK.

Witnesses:
WESTMINSTER ABBEY,
EDGAR C. LE BLANC.

Copies of this patent may be obtained for five cents each, by addressing the "Commissioner of Patents, Washington, D. C."